United States Patent Office 3,167,964
Patented Feb. 2, 1965

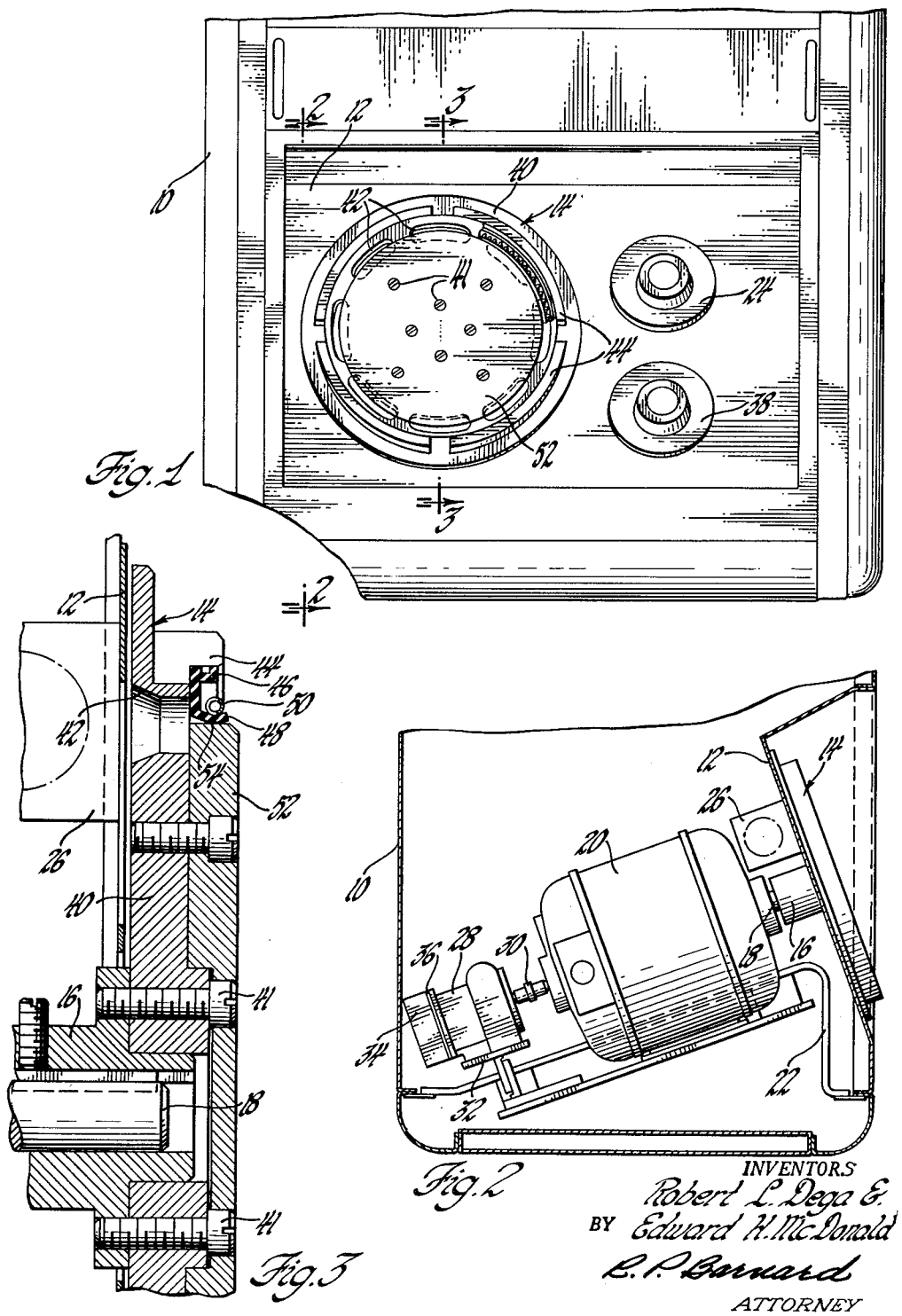

3,167,964
APPARATUS AND METHOD FOR TESTING
SEAL QUALITY
Robert L. Dega, Utica, Mich., and Edward H. McDonald,
Tipp City, Ohio, assignors to General Motors Corporation, Detroit, Mich., a corporation of Delaware
Filed Apr. 10, 1961, Ser. No. 101,950
5 Claims. (Cl. 73—432)

This invention relates to a method and apparatus for testing seal quality and, more particularly, to a method and apparatus for measuring the effect of centrifugal forces on lip-type seals with a stroboscope to determine sealing qualities.

This invention has been particularly designed for inspecting lip-type seals prior to their association with a shaft member in use. In general, a lip-type seal comprises an outer metallic casing within which an elastomer annulus is secured. A portion of the elastomer member is formed as a flexible lip which extends radially inwardly for wiping engagement with a shaft extending therethrough. Conventional lip-type seals generally are provided with a mechanical springing device which is associated with the flexible lip to insure proper engagement of the flexible lip with the shaft on which it is mounted. It has been determined that seal lip pressure as exerted by the elastomer member against the shaft on which it is assembled must be critically controlled within predetermined limits to obtain satisfactory sealing results in operation. Seal lip pressure is likely to vary around the periphery of the flexible lip because of variations in hardness and flexibility of the elastomer member, in diameter, eccentricity and in spring forces. For any particular sealing application wherein a lip-type seal is to be associated with a particular size shaft, a range of seal lip pressures which will provide satisfactory performance can be determined. It has been ascertained that seal lip pressures can be either too low or too high, and that lip-type seals having either a low lip pressure or a high lip pressure will become "leakers" and fail to meet predetermined sealing requirements. Consequently, methods and apparatus for determining seal quality are desirable and have recently begun to be widely adopted in industry.

The purpose of this invention is to provide a method and apparatus for testing seal units prior to their assembly and use with a shaft element to determine whether the seal units will have satisfactory sealing qualities in actual use. An object of this invention is to provide a simplified method of determining seal lip pressures by measuring the resistance of the flexible lip portion of a seal unit to centrifugal forces applied thereto. Another object of this invention is to provide apparatus for measuring the effect of centrifugal force on the lip portion of lip-type seal units by visual inspection. Still another object of this invention is to provide a method and apparatus for quickly and efficiently determining whether seal lip pressures fall within predetermined ranges by determining the presence or absence of clearance between a seal lip portion and a test shaft with which it is associated. Other objects and advantages of the present invention are disclosed in the following detailed description wherein reference is made to the accompanying drawings on which:

FIGURE 1 is a side elevational view of apparatus embodying the present invention;

FIGURE 2 is a sectional view taken along the line 2—2 in FIGURE 1; and

FIGURE 3 is a partial sectional view taken along the line 3—3 in FIGURE 1.

Referring now to FIGURES 1 and 2, the apparatus of the present invention is mounted in a sheet metal casing or the like 10 having a recessed testing panel 12 which is inwardly and upwardly inclined to improve the machine operator's view of the test apparatus. A testing fixture 14 is rotatably mounted adjacent the upper surface of the panel 12 and is secured by a hub portion 16 to a rotatable shaft 18 of motor means 20. The motor means 20 comprises a conventional variable speed electric motor which is mounted on a bracket 22 within the casing 10. A speed control 24 is mounted on the panel 12 and is connected in any suitable manner to a commercially available speed control unit which is connected to the electric motor 20 in a conventional manner. Since the motor means and controls therefor are all conventional, a detailed description is unnecessary. Rotation of the control 24 causes variations in motor speed and suitable graduations may be provided around the control 24 to indicate the motor speed to the machine operator.

A commercially available stroboscope 26 is secured to the lower side of the panel 12 and is arranged so that the light emission therefrom is directed upwardly and outwardly at substantially right angles to the panel 12. The stroboscope 26 is actuated by a conventional contactor-type control unit 28 which is connected by any suitable coupling means 30 to the other end of the motor shaft 18. The contactor control unit 28 and the stroboscope 26 are commercially available and the operation thereof is generally so well understood that no detailed description is provided. The function of the apparatus is to cause emission of light from the stroboscope 26 once per every revolution of the motor shaft 18. The contactor control unit 28 is mounted on a bracket 32 and connected to the bracket 22 in any suitable manner. The position of the shaft 18 at which the contactor 28 energizes the stroboscope 26 may conventionally be varied by rotating a control cap 34. Thus, the contactor can be rotated 360° relative to the shaft 18 so that the stroboscope 26 can be energized when any portion of the test unit 14 passes adjacent the stroboscope unit. In order to provide for adjustment of the contactor control unit, a sprocket wheel or the like 36 may be mounted on the control cap 34 and connected in a conventional manner by a parallel shaft and sprocket wheel (not shown) to a control knob 38 mounted on the panel 12 adjacent the control knob 24. In this manner, rotation of the control knob 38 will vary the position of the contactor relative to the motor shaft 18. The control knob 38 may be provided with suitable indicia, such as angular markings from 0 to 360° so that the change in angular position of the contactor relative to the drive shaft 18 can be exactly controlled. Thus, when the knob has been turned 360°, the contactor will have been positioned 360° relative to the shaft 18.

Referring now to FIGURES 1 and 3, the test fixture 14 comprises an annular support plate 40 which is secured to the hub member 16 by suitable fastening devices, such as bolts 41. A plurality of light slots 42 are circumferentially spaced in radial outward alignment with the stroboscope 26 so that light from the stroboscope passes through the slots. An annular rim 44 is spaced radially outwardly circumjacent the light slots 42. The inner diameter of the rim 44 provides a seal seat which is substantially equal to the outer diameter of a seal unit 46 so that the seal unit may be received and retained by the rim 44 and the adjacent surface of the plate 40. The seal unit 46 is of the flexible lip-type and includes a radially inwardly extending lip portion 48 on which a conventional spring element 50 may be mounted. A test shaft or arbor 52 is concentrically mounted on the plate 40 relative to the rim 44 and is spaced radially inwardly therefrom. The diameter of the stub shaft 52 is the same as the nominal diameter of the shaft with which the seal unit is to be associated in actual use. The dimensional arrangement of the rim 44 and the test shaft 52 relative to the seal unit 46 is such that the flexible lip portion 48 will normally be in peripheral engagement at 54 with the outer periphery of the test shaft 52. It should be noted that the engagement area 54 is centrally located relative to the light slots 42 and, further, that any light passing through the slots 42 can only be seen if there is an opening or gap between the flexible lip 48 and the periphery of the test shaft 52.

In operation a test shaft 52 having suitable dimensional characteristics is mounted on the central plate and a seal unit 46 of a particular size adapted for use with a shaft having the same diameter as the shaft 52 is seated on the plate 40 against the rim 44. The flexible lip portion 48 of the seal unit is thereby in peripheral engagement with the test shaft 52 as shown at 54 if the seal unit has proper dimensional characteristics. When the motor 20 is energized, the test fixture 14 is rotated by the drive shaft 18. The contactor control unit 28 is actuated by the shaft 18 at a particular angular phase of rotation so that the stroboscope 26 emits light directed into the light slots 42. If the flexible lip portion 48 of the seal unit 46 is in engagement with the test shaft 52 at that particular shaft location, no light will be seen through the test unit. By rotating the control knob 38, the emission of light from the stroboscope 26 relative to the periphery of the test shaft 52 can be varied to cause the stroboscope to be energized at any point around test shaft. Any deflection of the flexible lip 48 which leaves a gap between the test shaft 52 and the lip portion will be revealed by the stroboscope light.

In this manner, seal lip pressure is measured by the centrifugal force necessary to cause the flexible lip to be moved radially outwardly out of engagement with the test shaft 52. A predetermined test range of centrifugal forces can be determined within which acceptable seals will not be disengaged from the periphery of the test shaft and within which no light will be visible. Since seal lip pressure can be too high, a satisfactory seal must be entirely disengaged from the shaft periphery at the upper limit of the test range. Accordingly, each seal unit can first be tested at a low rotational motor speed to make sure that no light is seen around the entire periphery of the test shaft and then tested at a higher rotational speed to insure that light is seen around the entire periphery of the test shaft. In other words, a seal unit which has too low a lip seal pressure will become a "leaker" in use; and, therefore, the lip pressure of the seal must be sufficient at some minimum rotational speed to maintain contact of the flexible lip portion 48 with the periphery of the test shaft 52 around the entire periphery. Similarly, the lip pressure of the seal unit must be less than a predetermined maximum pressure so that the flexible lip portion 48 will be entirely disengaged from the periphery of the test shaft 52 at some maximum rotational speed.

It is contemplated that other types of seal unit tests may employ the use of a stroboscope and centrifugal forces to measure seal lip pressure. It should be readily appreciated that the aforedescribed testing apparatus and method differs substantially from previously known testing methods which measured various dimensional characteristics of annular objects by light passage in a test fixture. Such devices are commonly called ring gauges and are illustrated in U.S. Patents 2,441,343 and 2,433,558. Accordingly, the scope of this invention is intended to be commensurate with the novel method and apparatus disclosed, except insofar as limited by the prior art.

The invention claimed is:

1. Apparatus for measuring sealing quality of a seal unit having a flexible lip portion adapted for normal sealing engagement with a shaft and comprising; a test fixture, motor means rotatably connected to said test fixture, an arbor mounted on said test fixture and having a diameter designed to simulate a shaft with which a particular size seal unit is to be associated in use, a seal seat provided on said test fixture and spaced radially outwardly from and circumjacent to said arbor to receive and support said particular size seal unit in normal sealing relationship with said arbor with the flexible lip portion thereof in peripheral engagement with said arbor, a light source provided adjacent said test fixture to direct light substantially parallel to the outer peripheral surface of said arbor with which the flexible lip portion of a particular size seal unit is peripherally engaged, light transmitting means on said test fixture to permit and confine light to travel therethrough during rotation thereof between said flexible lip portion and said arbor when there is no contact therebetween, control means to vary the rotational speed of said motor and said test fixture and to variably displace said flexible lip portion radially outwardly relative to said arbor from said normal sealing relationship by varying the centrifugal force thereon, and means to control energization of said light source to illuminate alternate circumferential portions of said seal around the entire inner periphery of said lip portion to ascertain whether all portions of said lip portion of said seal are in contacting or non-contacting engagement with said arbor.

2. An apparatus for measuring the sealing quality of an elastomeric seal unit having an annular flexible lip portion, said apparatus comprising a rotatable support means adapted to receive the lip portion thereon and to retain the seal unit, said seal unit rotating conjointly with the support means, the lip portion being uniformly engageable with the support means at lower rotational speeds and responsive to variable centrifugal forces causing disengagement thereof at higher rotational speeds, a stroboscopic light source adjacent the support means, and means to rotate the support means at variable rotational speeds whereby light from the stroboscopic light source will pass between the support means and lip portion at the area of disengagement to provide an indication of radially directed forces exerted by the lip portion.

3. The apparatus according to claim 2 comprises in addition, means to direct and confine light from said light source to selected areas of peripheral disengagement of the lip portion with the support means, and control means associated with the support means to cause energization of the light source at predetermined angular rotational positions of the support means.

4. A method of checking lip type shaft seals comprising, mounting a seal to be tested on a rotatable fixture with the lip of the seal in engagement with a portion of the fixture simulating a shaft of the size with which the seal is intended to be used, securing the seal to the fixture for conjoint rotation therewith, rotating the fixture and the seal at a predetermined speed, establishing whether the seal lip and the shaft simulating portion of the fixture remain in engagement, rotating the fixture and the seal at a predetermined higher speed, and establishing whether the seal lip and the shaft simulating portion of the fixture remain in engagement.

5. A method of checking lip type shaft seals comprising, mounting a seal to be tested on a rotatable fixture with the lip of the seal in engagement with a portion of the fixture simulating a shaft of the size with which the seal is intended to be used, securing the seal to the fixture for conjoint rotation therewith, rotating the fixture and the seal at a predetermined speed, directing light to one side of the seal lip while the seal is being rotated at said predetermined speed and establishing whether the directed light passes between the seal lip and the shaft simulating portion of the fixture, rotating the fixture and the seal at a predetermined higher speed, and directing the light to one side of the seal lip while the seal is being rotated at said predetermined higher speed and establishing whether the directed light passes between the seal lip and the shaft simulating portion of the fixture.

(References on following page)

References Cited in the file of this patent

UNITED STATES PATENTS

| | | |
|---|---|---|
| 2,355,092 | Meister | Aug. 8, 1944 |
| 2,433,558 | Hurley | Dec. 30, 1947 |
| 2,441,343 | Becker | May 11, 1948 |
| 2,487,628 | Aller | Nov. 8, 1949 |
| 2,823,544 | McCoy | Feb. 18, 1958 |
| 2,944,424 | Senger | July 12, 1960 |

OTHER REFERENCES

Pages 406–410 in text, "Machine Design," by Maleev, published in 1946 in International Text Book Press.